Aug. 16, 1927.
E. S. COBB
1,639,257
TEMPERATURE REGULATING DEVICE FOR ORCHARDS
Filed Jan. 3, 1927
3 Sheets-Sheet 1
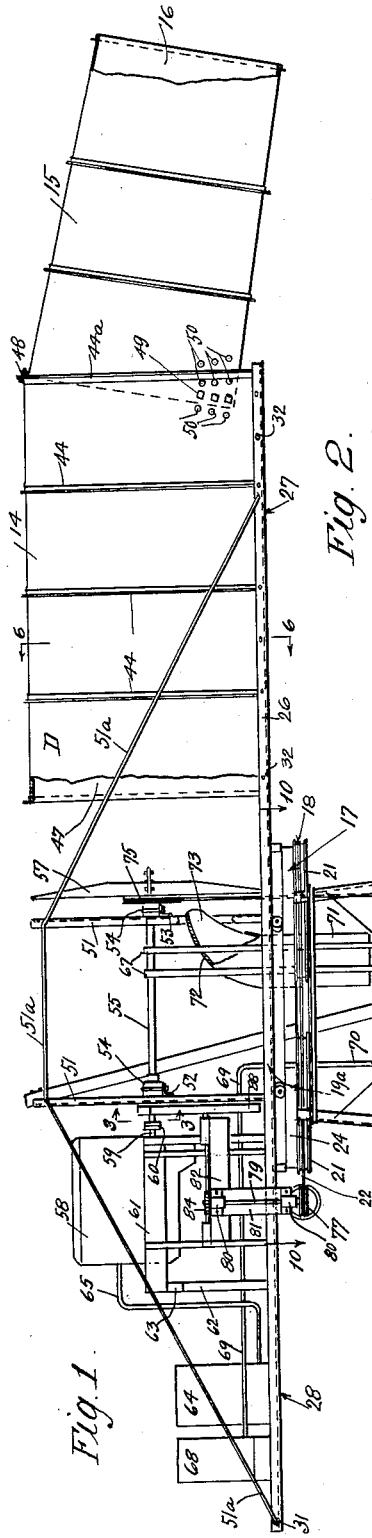
Fig. 1.
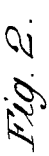
Fig. 2.
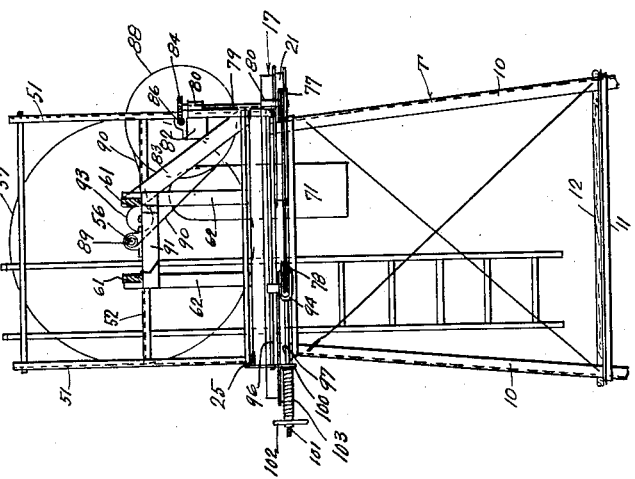
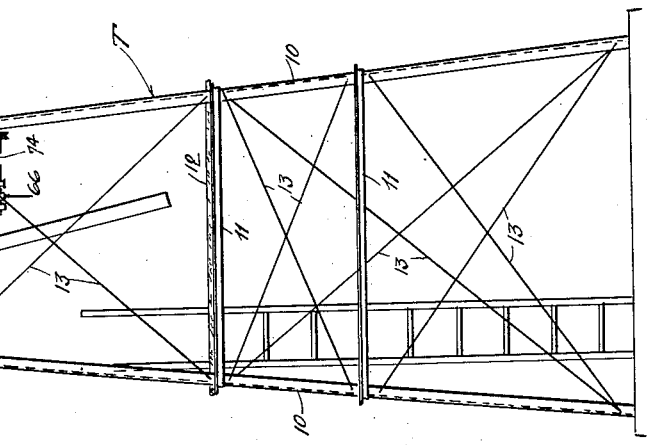
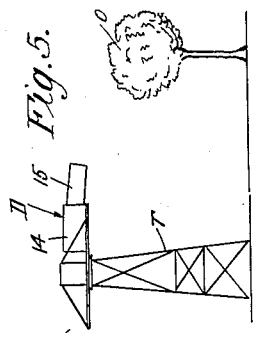
Fig. 5.
Inventor
Edward S. Cobb.
Attorney.

Aug. 16, 1927.  E. S. COBB  1,639,257
TEMPERATURE REGULATING DEVICE FOR ORCHARDS
Filed Jan. 3, 1927   3 Sheets-Sheet 2
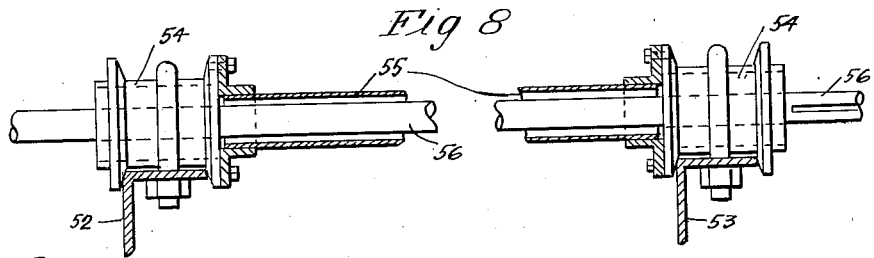
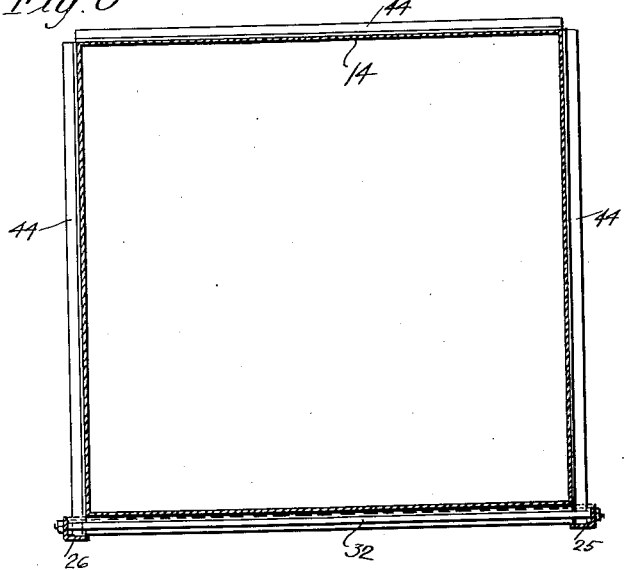
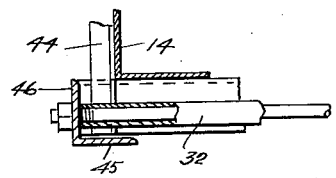
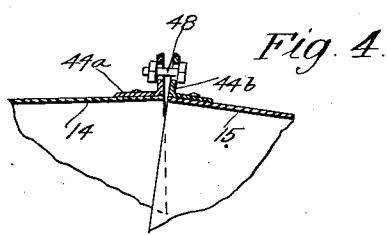
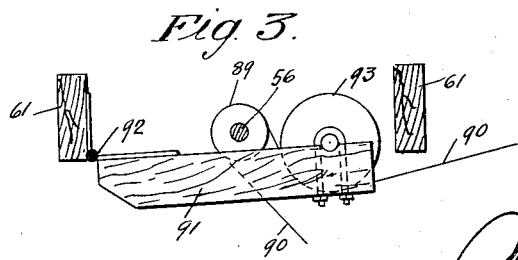
Inventor.
Edward S. Cobb.
Attorney.

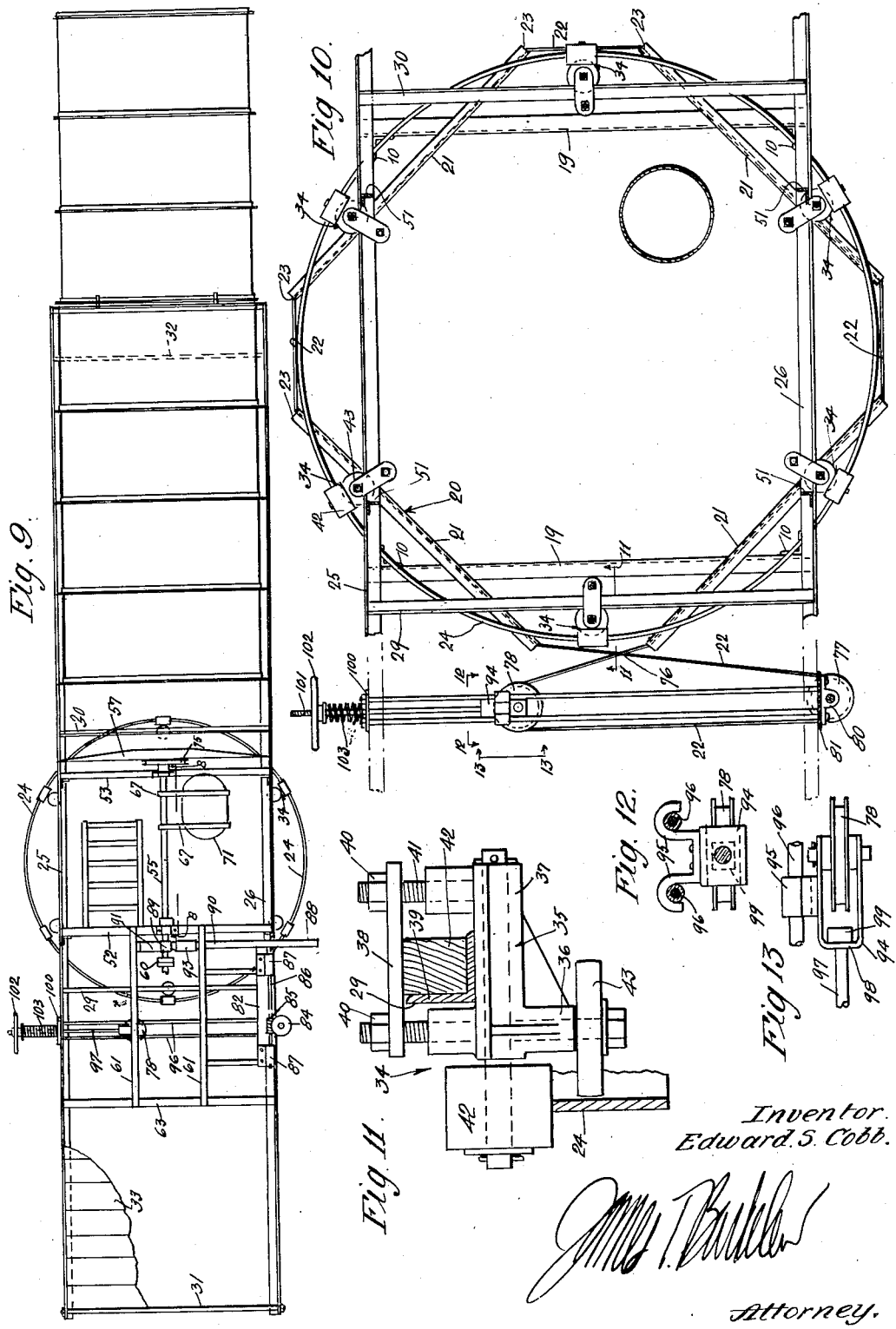

Patented Aug. 16, 1927.

1,639,257

UNITED STATES PATENT OFFICE.

EDWARD S. COBB, OF LOS ANGELES, CALIFORNIA.

TEMPERATURE-REGULATING DEVICE FOR ORCHARDS.

Application filed January 3, 1927. Serial No. 158,539.

This invention relates to devices for circulating air above and down around the trees of orchards or plantings of plantations to protect them from the damaging effects of excessively high or low temperature.

These devices are adapted to be positioned centrally of an area to be protected, and by reason of the air circulation set up, prevent the deposit of frost on the plantings during cold, calm weather; while, during excessively hot, calm weather the mechanically set-up air movement, which may be either moderate or brisk, protects the plantings from heat injury. Should the temperature fall to such a degree that simple circulation of the air does not suffice to prevent injury from cold, I provide means for heating the air as it passes through the circulating device, and the heated air is distributed over and downwardly into the plant area to be protected.

The many advantages gained by the use of this method of orchard protection over the so-called "smudge pot" method, and the general type of device provided for carrying out the method, are discussed in my United States Letters Patent No. 1,317,959 on frost preventer for orchards, issued October 7, 1919, No. 1,357,314 on process of preventing frost or heat injury in orchards, issued November 2, 1920, and No. 1,571,467 on temperature regulating device for orchards, issued February 2, 1926. Since reference may be had to these patents, it will be unnecessary for me here to discuss their subject-matter except to briefly describe the structure of circulating devices there disclosed, in order that I may more definitely point out certain novel features of the present invention.

In the several devices disclosed in the above-named patents I employ directors opening to a point above the plantings to be protected, the directors inclining somewhat downwardly from the horizontal toward their outlet orifices in order that the air blast forced through the director may be directed outwardly over and downwardly into the plants of the protected orchard. By rotating the director, the device progressively directs a current of air over the surrounding area, and by applying heat to the circulated air through the medium of a burner (or heat delivery pipe from any external heat source) warm drafts may be directed to the plantings. These devices all have directors so shaped that the air in passing from inlet to outlet has to be turned in its course from substantially vertical passage to substantially horizontal passage, there being substantially right angle bends in the director to accomplish this.

In contradistinction to these directors, I employ in the present device a substantially horizontal director, though it preferably inclines, either in whole or in part, somewhat downwardly from inlet to outlet end. By virtue of this provision, the propeller which creates the air blast may be arranged to revolve about a horizontal axis substantially coincident with that of the director and spaced somewhat outwardly from the inlet end of said director. The air may thus be forced through the director without first confining it, such confinement existing in connection with certain of the patented devices, and there is a reduction in energy lost in that occurring in said other devices wherein the vertically, upwardly flowing currents of air are directed through a substantially right angle bend in their passage from inlet to outlet.

The device here disclosed may be generally considered as a tower supporting a turntable upon which the director is mounted. The rotatable table carrying the director is also adapted to carry the power plant for revolving the table, driving the propeller, and, where an oil burner which includes a rotor is used, for rotating the burner rotor. The table may also support tanks for the storage of motor fuel and burner fuel, these tanks and the engine preferably being disposed in a manner to counterbalance the oppositely projecting director which ordinarily overhangs the table, proper, to obvious advantage. There is thus provided an entirely self-contained temperature regulating unit supported by a tower in a position properly to direct air upon the plantings to be protected, it following that no complicated drive connections need be made between tower and table elements and that the shape of the director is in no way controlled by the tower structure.

Further objects and novel features of the invention will be made apparent in the following detailed description, it being noted in connection with this description that the device is such that it may be fabricated and erected with ease and at comparatively low cost, though it has relatively high efficiency.

Reference will be had to the accompanying drawings in which:

Fig. 1 is a side elevation of a device embodying my invention;

Fig. 2 is a fragmentary view of Fig. 1 looking from the left thereof, the storage tanks, motor and cable drive being omitted in order more clearly to show up the remaining structure;

Fig. 3 is an enlarged section on line 3—3 of Fig. 1;

Fig. 4 is a fragmentary, enlarged detail showing one method of coupling the two parts of which my director is preferably made up;

Fig. 5 is a schematic view showing approximately the disposition of the device with relation to plantings to be protected;

Fig. 6 is a section on line 6—6 of Fig. 1;

Fig. 7 is an enlarged fragmentary view of one of the lower corners of Fig. 6;

Fig. 8 is an enlarged section on line 8—8 of Fig. 9;

Fig. 9 is a plan view of Fig. 1 but omitting the storage tanks, motor, and certain parts of the cable driving and underlying structure in order to clarify the showing;

Fig. 10 is an enlarged section on line 10—10 of Fig. 1;

Fig. 11 is an enlarged section on line 11—11 of Fig. 10;

Fig. 12 is an enlarged section on line 12—12 of Fig. 10; and

Fig. 13 is an enlarged, fragmentary view looking from the position of line 13—13 in Fig. 10.

In the drawings I show a tower T, preferably of skeleton construction, including corner columns 10, band braces 11, deck or platform 12. and cable bracing 13.

Rotatably supported on tower T is a director generally indicated at D, said director preferably, though not necessarily, being made up of two parts or sections 14 and 15, part 14 being substantially horizontal, and part 15 inclining somewhat downwardly from part 14 towards its delivery orifice 16. The tower is of sufficient height to bring director D above trees O of the orchard to be protected, the inclination of director part 15 causing the direction of air from the director downwardly as well as outwardly from the tower and thus outwardly and downwardly from the tower onto the trees to be protected.

Director D may be considered as mounted for rotation on tower T through the medium of a turntable generally indicated at 17, said table including a stationary track or guide portion 18 supported by the tower and a rotary table portion 19$^a$ upon which the director and associated elements are mounted.

I will proceed to a somewhat detailed description of the preferred form of turntable employed, as well as of the director and associated elements, but it will be understood that these particularities of description and detailed showing are merely illustrative of the preferred embodiment and in no way are to be considered as limitative on my claims except where they are definitely specified in said claims.

At the top of corner columns 10 is an encircling, square band 19, preferably of angle iron and welded to said columns. Overlying and welded to band 19 is a pulley-like drive connective element generally indicated at 20, and made up of channel irons 21, arranged channel out, said channels being arranged with relation to one another in the form of a square open at its corners, as clearly shown in Fig. 10. Table-rotating cable 22 is drawn through the channels of members 21 and spans the gaps between the adjacent ends 23 thereof, it being made apparent in the following description that said cable is merely laid on and off members 21 and hence not being exposed to undue wear where it is trained over the channel ends. Of course, a circular drive connective element may be used or a polygonal element of shape other than that illustrated may be employed, though the illustrated type is preferable due to its extreme simplicity and ease of fabrication.

Supported on top members 21 is a track 24, this track preferably being made up of a flat band bent to circular formation and welded at its lower edge to members 21. The track is preferably arranged centrally over tower T.

The rotary table portion 19$^a$ of turntable 17 includes a pair of horizontally spaced and horizontally extending angle iron rails 25, 26, said rails projecting from or overhanging tower T at one side thereof as at 27, and their ends 28 projecting from or overhanging the diametrically opposite side of the tower. The rails are tied together by cross members 29 and 30, as well as by spacers 31, 32. The ends 28 of said rails may also support a deck or floor boards 33 (Fig. 9) though these boards are shown only fragmentarily.

In Fig. 11 I have shown the preferred method of mounting rails 25, 26 for rotation about the vertical axis of the tower and for guiding the table portion 19$^a$, of which said rails may be a part, in its rotation about said axis. Applied to rails 25, 26, and members 29 and 30, are the roller units 34, said units being of a nature to be affixed with equal facility to any of said members and being angularly spaced with respect to one another and radially spaced from the axis of the tower in a manner to support portion 19ª properly for rotation with respect to the tower, said units co-operating with track 24 for this purpose.

Thus I have shown, in Fig. 11, an L-shaped casting 35 having a vertical leg 36 and a horizontal leg 37. The casting is clamped either to the side rails or to members 29, 30, by means of a clamp plate 38 which is drawn against the edge of the upstanding flange 39 of one of said rails or cross members by means of nuts 40 on the casting-carried bolts 41, the upper face of leg 37 being drawn into tight contact with the lower face of member 29, or equivalent member, by this action. Preferably, there is provided a filler block 42 between clamp bar 38 and angle 39, for obvious purposes of reinforcement.

Leg 37 supports a traction roller 42 which is adapted to roll upon track 24, while leg 36 supports a guide roller 43 which is adapted to engage the inner peripheral face of track 24 in a manner to center the rotary table with respect to the track and to hold said table from horizontal displacement. It will be seen that, in effect, rollers 43 perform the same function as would flanges upon rollers 42, but the guide rollers are by far preferable to such flanges due to the degree of curvature of the track.

Director D, though it may be made up of a single piece or rigidly connected pieces bent to the required shape, preferably is made up of the two parts 14, 15. Both these parts preferably are tubes of substantially square cross-section, the metal making up the tubes being reinforced by encircling angle iron bands or straps 44. Section 14 is disposed on ends 27 of rails 25, 26, said section resting on the horizontal flanges 45 of said rails in the manner clearly shown in Fig. 7, and being clamped between the vertical flanges 46 of said rails by the spacer and tie bar construction designated at 32 in Figs. 9 and 7.

The inner end of section 14 may be considered as defining the inlet orifice 47 of the director, this orifice preferably being spaced horizontally from the vertical axis of the tower. Section 15 is preferably of somewhat smaller cross section than section 14 so it may project with varying degree into the bore of the larger section, connection between said sections preferably being made by the means shown in Figs. 1 and 4. Thus the end-most angle iron strap 44ª applied to section 14 carries a loosely fitting bolt 48 which has loose connection with the inner-most reinforcing angle iron strap or band 44ᵇ. This construction provides a pivotal or hinge connection between the two sections, it therefore being possible to swing section 15 to vary its angle with respect to the horizontal and thus direct air from section 14 downwardly as well as outwardly from the tower. With the proper inclination given to section 15, said section is then held releasably in position by bolts 49 which pass through the plates of the two sections near their lower edges. There may be provided several series of holes 50 in the side plates to allow retention of sections 15 in various positions of adjustment.

Extending upwardly from rails 25, 26, are the four posts 51, two of which are connected by a cross-bar 52, and the other two by cross-bar 53. Cable ties 51ª may be applied to posts 51 and rails 25, 26 in the manner clearly shown in Fig. 1, these ties providing support for the free ends of the rails and structure carried thereby. Cross bars 52 and 53 carry alined boxes 54 which support a tubular shaft housing 55 and provide bearing for a propeller shaft 56 which extends through said housing and substantially in axial alinement with director section 14. The forward end of shaft 56 carries a propeller 57 which may be of any suitable design, said propeller being spaced horizontally from orifice 47 and being adapted to deliver previously unconfined air from the upper air levels to the director.

While any suitable motive power may be drivingly connected through shaft 56 to propeller 57, I prefer to utilize an internal combustion engine conventionally illustrated at 58, the engine shaft 59 being coupled to propeller shaft 56 at 60. The engine 58 is supported on sills 61 held above rails 25, 26, by posts 62 and cross members 63, the engine and preferably the storage tank 64 which carries the engine fuel and is connected to said engine through line 65 being disposed in overhanging relation with respect to tower T so said engine and tank tend to counterbalance director D.

It is sometimes desirable that heated air be supplied to director D during periods of extreme cold. While any suitable means may be provided for thus supplying heated air, I preferably provide an oil burner generally indicated at 66 which is suspended from housing 55 by straps or hangers 67. This burner is supplied with fuel oil from storage tank 68 on platform 31 through a pipe line 69 which has a vertical extension 70 between the table and tower at a point within the circle defined by track 24.

Burner 66 points upwardly and preferably is disposed immediately below a vertically arranged duct 71, supported from housing 51 by straps 67. This duct preferably curves at its upper end 72, its delivery orifice 73 being adapted to direct air heated by burner 66 in a substantially horizontal direction and within the spread of propeller 67. Preferably, though not necessarily, duct 71 is arranged out of vertical alinement with the axis of propeller 57, this not only providing for a more efficient delivery of heated air to the propeller but also avoiding the chance of heated air rising directly into contact with bearings 54.

It will be seen that hot air rising through duct 71 and then passing horizontally through orifice 73 is carried into the director by propeller 57, the propeller serving to churn the cold, previously unconfined air and the hot air together, and insuring an even mixture for delivery from the director outlet.

It will be seen that the director, propeller, oil burner, hot air duct, and power plant are adapted to revolve as one with rails 25, 26 about the axis of the tower, an entirely self-contained temperature regulating unit thus being mounted for rotation about an elevated point.

When burner 66 is of the type having a rotor element, such rotor (not shown) may be driven by shaft 74 which is drivingly connected to shaft 56 through sheave and cable connection 75.

I will now describe the preferred means for rotating the table 19ª and elements supported thereby. Cable 22 is crossed at 76 and passes over pulleys 77 and 78; pulley 77 being hereinafter referred to as a traction sheave and being carried on vertical shaft 79 which has bearing at 80 on a vertical plate 81 secured to rail 26 and on an overlying rail 82 supported on diagonals 83 extending from the rail 26 to sill 61. At the upper end of shaft 79 is a worm wheel 84 which meshes with worm 85 on horizontal shaft 86, said shaft having bearing at 87 on rail 82. Shaft 86 carries a relatively large pulley 88 which is driven by belt 90 from relatively small pulley 89 on shaft 56.

A simple, convenient type of belt tightener is shown in Fig. 3. This device consists of a substantially horizontal arm 91 hingedly connected to one of the sills 61 at 92 and carrying at its free end an idler roller 93, said idler engaging belt 90. The weight of the idler and swinging arm is such that they tend to keep the slack out of belt 90 and insure proper frictional contact between said belt and pulleys 88, 89.

Idler pulley 78, which is adjustable toward and away from sheave 77 in order to regulate the tension of the cable 22, is supported in a yoke 94 which has upwardly extending hook arms 95. These arms slidingly engage cross rails 96 which extend from rail 25 to rail 26. The yoke and hence pulley 78 is moved longitudinally with respect to rods 96, and hence toward and away from sheave 77 in a manner to vary the cable tension, by means of an operating rod 97 which extends through the cross arm 98 of yoke 94 and is held against rotation with respect thereto by means of the polygonal head 99 disposed at the inner side of said arm. The free extremity of rod 96 extends, with bearing, through a plate 100 depending from rail 25 and is threaded as at 101 to take hand-wheel nut 102. Spring 103 encircles rod 97 between plate 100 and wheel 102, exerting a normal tendency to move said wheel and hence the rod to the left in Fig. 2 and thus maintain cable 22 under tension. Of course, by threadedly adjusting wheel 102 along rod 97 the tension of spring 103 may be varied to cause a coincident adjustment of cable tension.

It will be seen that the engine shaft 59 is drivingly connected to sheave 77 through the following elements: pulley 89, belt 90, pulley 88, shaft 86, worm 85, worm wheel 84, and shaft 79. It follows that rotation of the engine shaft rotates sheave 77 in a manner to follow the cable and thereby to rotate table 19ª about the vertical axis of the tower, and that the director thereby is moved in a manner to direct air delivered to it by propeller 57, in rotative progression over the area surrounding tower T, the inclination of section 15 serving to direct the air downwardly as well as outwardly.

While the propeller is, in effect, direct-connected through the engine shaft to propeller shaft 86, the drive connection between the engine shaft and traction sheave 77 is such that the angular velocity of table 19ª is a great deal less than that of the engine shaft. For instance, a satisfactory ratio has been found to be 1200 R. P. M. for the propeller shaft and 0.30 R. P. M. for table 19ª.

As stated at the outset, while I have illustrated preferred means for mounting and driving the various elements of my device, it will be understood that my broader claims contemplate a structure wherein particularities of arrangement and drive may be different from those shown and illustrated, for the drawings and description are to be considered merely as illustrative of and not restrictive on the broader claims appended hereto.

I claim:

1. Plantation protecting apparatus of the character described, embodying a supporting structure extending to a point above the plantings to be protected, a substantially horizontal director mounted on top the structure and with its inlet orifice opening to the atmosphere, a propeller adjacent the inlet orifice and arranged for rotation about a horizontal axis, and means for driving the propeller; said director being adapted to direct air delivered to it by the propeller outwardly above the plantings to be protected.

2. Plantation protecting apparatus of the character described, embodying a supporting structure extending to a point above the plantings to be protected, a substantially horizontal director mounted on top the structure and with its inlet orifice opening to the atmosphere, the director near its delivery orifice inclining downwardly, a propeller adjacent the inlet orifice and arranged for rotation about a horizontal axis, and means for driving the propeller; said director being adapted to direct air delivered to it by the propeller outwardly above and downwardly onto the plantings to be protected.

3. Plantation protecting apparatus of the character described, embodying a supporting structure extending to a point above the plantings to be protected, a substantially horizontal director mounted on top the structure and with its inlet orifice opening to the atmosphere, a propeller adjacent the inlet orifice and arranged for rotation about a horizontal axis, means for driving the propeller; said director being adapted to direct air delivered to it by the propeller outwardly above the plantings to be protected, and means to heat the air prior to its delivery from the director.

4. Plantation protecting apparatus of the character described, embodying a supporting structure extending to a point above the plantings to be protected, a substantially horizontal director mounted on top the structure and with its inlet orifice opening to the atmosphere, the director near its delivery orifice inclining downwardly and being adjustable to vary the degree of inclination, a propeller adjacent the inlet orifice and arranged for rotation about a horizontal axis, and means for driving the propeller; said director being adapted to direct air delivered to it by the propeller outwardly above and downwardly onto the plantings to be protected.

5. Plantation protecting apparatus of the character described, embodying a supporting structure extending to a point above the plantings to be protected, a two-part director mounted on top the structure, the part having the inlet orifice being substantially horizontal, and the part having the delivery orifice inclining downwardly from the horizontal part, and a vertically disposed, power driven propeller supported adjacent the inlet orifice and adapted to force air thereinto.

6. Plantation protecting apparatus of the character described, embodying a supporting structure extending to a point above the plantings to be protected, a two-part director mounted on top the structure, the part having the inlet orifice being substantially horizontal, and the part having the delivery orifice inclining downwardly from the horizontal part, a vertically disposed, power driven propeller supported adjacent the inlet orifice and adapted to force air thereinto, and means to heat the air prior to its delivery from the director.

7. Plantation protecting apparatus of the character described, embodying a supporting structure extending to a point above the plantings to be protected, a two-part director mounted on top the structure, the part having the inlet orifice being substantially horizontal, and the part having the delivery orifice inclining downwardly from the horizontal part, a vertically disposed, power driven propeller supported adjacent the inlet orifice and adapted to force air thereinto, and means to heat the air before its delivery to the director by the propeller.

8. Plantation protecting apparatus of the character described, embodying a supporting structure extending to a point above the plantings to be protected, a two-part director mounted on top the structure, the part having the inlet orifice being substantially horizontal, and the part having the delivery orifice inclining downwardly from the horizontal part, said second mentioned part being adjustable as to degree of inclination, and a vertically disposed, power driven propeller supported adjacent the inlet orifice and adapted to force air thereinto.

9. Plantation protecting apparatus of the character described, embodying a supporting structure extending to a point above the plantings to be protected, a substantially horizontal director mounted on top the structure and with its inlet orifice opening to the atmosphere, a propeller adjacent the inlet orifice and arranged for rotation about a horizontal axis, means for driving the propeller; said director being adapted to direct air delivered to it by the propeller outwardly above the plantings to be protected, and means to heat the air prior to its delivery from the director; said last mentioned means being characterized as a heater supported below the inlet orifice, and a duct leading from the heater towards the inlet orifice.

10. Plantation protecting apparatus of the character described, embodying a supporting structure extending to a point above the plantings to be protected, a turntable mounted on top the structure, a substantially horizontally disposed director on the table, and a propeller mounted on the table adjacent the inlet orifice of the director and adapted to force air thereinto; said director being adapted to direct air delivered to it by the propeller outwardly above the plantings to be protected.

11. Plantation protecting apparatus of the character described, embodying a supporting structure extending to a point above the plantings to be protected, a turntable mounted on top the structure, a substantially horizontally disposed director on the table, a propeller mounted on the table adjacent the inlet orifice of the director and adapted to force air thereinto; said director being adapted to direct air delivered to it by the propeller outwardly above the plantings to be protected, and a power plant on the table and drivingly connected to the propeller.

12. Plantation protecting apparatus of the character described, embodying a supporting structure extending to a point above the plantings to be protected, a turntable mounted on top the structure, a substantially horizontally disposed director on the table, a propeller mounted on the table adjacent the inlet orifice of the director and adapted to force air thereinto; said director being adapted to direct air delivered to it by the propeller outwardly above the plantings to be protected, and means for rotating the table and thereby moving the director in a manner to direct air therefrom in rotative progression over the plantings.

13. Plantation protecting apparatus of the character described, embodying a supporting structure extending to a point above the plantings to be protected, a turntable mounted on top the structure, a substantially horizontally disposed director on the table, a propeller mounted on the table adjacent the inlet orifice of the director and adapted to force air thereinto; said director being adapted to direct air delivered to it by the propeller outwardly above the plantings to be protected, and a power plant on the table drivingly connected to the supporting structure in a manner to rotate the table and thereby direct air from the director in rotative progression over the plantings.

14. Plantation protecting apparatus of the character described, embodying a supporting structure extending to a point above the plantings to be protected, a turntable mounted on top the structure, a substantially horizontally disposed director on the table, a propeller mounted on the table adjacent the inlet orifice of the director and adapted to force air thereinto; said director being adapted to direct air delivered to it by the propeller outwardly above the plantings to be protected, and a power plant on the table and drivingly connected to the propeller, and a driving connection between said plant and the supporting structure whereby said plant is adapted to rotate the table and thereby direct air from the director in rotative progression over the plantings.

15. Plantation protecting apparatus of the character described, embodying a supporting structure extending to a point above the plantings to be protected, a turntable mounted on top the structure, a substantially horizontally disposed director on the table, a propeller mounted on the table adjacent the inlet orifice of the director and adapted to force air thereinto; said director being adapted to direct air delivered to it by the propeller outwardly above the plantings to be protected, and means supported by the table adapted to heat the air prior to its delivery from the director.

16. Plantation protecting apparatus of the character described, embodying a supporting structure extending to a point above the plantings to be protected, a turntable mounted on top the structure, a substantially horizontally disposed director on the table, a propeller mounted on the table adjacent the inlet orifice of the director and adapted to force air thereinto; said director being adapted to direct air delivered to it by the propeller outwardly above the plantings to be protected, and means supported by the table adapted to heat the air prior to its delivery from the director; said last-mentioned means being characterized as a heater disposed below the inlet orifice, and a duct leading from the heater towards the inlet orifice.

In witness that I claim the foregoing I have hereunto subscribed my name this 10th day of December 1926.

EDWARD S. COBB.